United States Patent
Bellens et al.

(10) Patent No.: US 10,104,494 B2
(45) Date of Patent: Oct. 16, 2018

(54) MARKER BASED ACTIVITY TRANSITION MODELS

(71) Applicant: UNIVERSITEIT GENT, Ghent (BE)

(72) Inventors: Rik Bellens, Ghent (BE); Sidharta Gautama, Ghent (BE)

(73) Assignee: UNIVERSITEIT GENT, Ghent (BE)

(*) Notice: Subject to any disclaimer, the term of this patent is extended or adjusted under 35 U.S.C. 154(b) by 0 days.

(21) Appl. No.: 15/026,826

(22) PCT Filed: Oct. 2, 2014

(86) PCT No.: PCT/EP2014/071174
§ 371 (c)(1),
(2) Date: Apr. 1, 2016

(87) PCT Pub. No.: WO2015/049340
PCT Pub. Date: Apr. 9, 2015

(65) Prior Publication Data
US 2016/0241993 A1    Aug. 18, 2016

(30) Foreign Application Priority Data

Oct. 2, 2013 (EP) .................................. 13186987

(51) Int. Cl.
*H04W 24/00* (2009.01)
*H04W 4/02* (2018.01)
(Continued)

(52) U.S. Cl.
CPC ............. *H04W 4/02* (2013.01); *G06Q 10/06* (2013.01); *G06Q 30/0201* (2013.01); *G06Q 50/30* (2013.01); *H04L 67/22* (2013.01)

(58) Field of Classification Search
CPC ...................................................... H04W 4/02
(Continued)

(56) References Cited

U.S. PATENT DOCUMENTS

| 2010/0317371 | A1 | 12/2010 | Westerinen et al. |
| 2012/0172017 | A1 | 7/2012 | Ratti et al. |
| 2012/0316774 | A1 | 12/2012 | Yariv et al. |

OTHER PUBLICATIONS

Manzoni et al., "Transportation Mode Identification and Real-Time CO2 Emission Estimation Using Smartphone," SENSEable City Lab, Massachusetts Institute of Technology, 2010.
(Continued)

*Primary Examiner* — Joel Ajayi
(74) *Attorney, Agent, or Firm* — Workman Nydegger

(57) ABSTRACT

A client device for gathering mobility information of a user is described. The device comprises a sensor data obtaining means for collecting sensor data representative for transportation-characteristic information of a user and a marker information obtaining means for collecting marker information, the marker information being related to an environmental characteristic of the user or an activity of the user not determined based on a transportation characteristic. The system also comprises a processing means for combining the transportation-characteristic information of the user and the marker information so as to be able to determine based thereon mobility information of the user. The system also comprises an output means for outputting the combined transportation-characteristic information and the marker information. A corresponding server device, method and computer implemented inventions also are disclosed.

16 Claims, 7 Drawing Sheets

(51) Int. Cl.
*G06Q 10/06* (2012.01)
*G06Q 50/30* (2012.01)
*G06Q 30/02* (2012.01)
*H04L 29/08* (2006.01)

(58) Field of Classification Search
USPC ..................................................... 455/456.1
See application file for complete search history.

(56) References Cited

OTHER PUBLICATIONS

Extended European Search Report for corresponding European Application 13186987.7, dated Jul. 4, 2014.
International Search Report for corresponding International PCT Application PCT/EP2014/071174, dated Dec. 8, 2014.

MARKER BASED ACTIVITY TRANSITION MODELS

FIELD OF THE INVENTION

The invention relates to systems for tracking individual displacement behavior as well as global mobility streams. It relates to devices for logging individual trajectory information as well as to systems for analyzing the collected information. The invention also relates to corresponding methods and software for collecting and/or processing information.

BACKGROUND OF THE INVENTION

Behavior of citizens or clients in the domains of mobility and retail is typically studied using surveys that poll in detail the daily activities of observed people using paper or online questionnaires. E.g. as transportation planning models move towards the use of micro-simulations of daily activities and travel patterns, there is pressure to increase the quantity and quality of travel survey data to feed the micro-models. Conventional survey methods (e.g. Dutch national travel survey) require participants to log all their activities and trips through paper diaries, and self-report them as accurately as possible. These self-reported surveys face problems including the fact that typically small sample sizes are involved, the fact that overtime, there are increasing non-response rates, the fact that there are a number of non-representative samples, the fact that there are a number of missing activities and trips, the fact that there may be imprecise travel time, etc.

Due to the burden on the respondents as well as the decrease in the quality of the recorded data, paper or web based diaries are used for capturing only a couple of days of travel behavior. GPS-based data collection methods have been introduced that are potentially more accurate and less of a burden on respondents compared to paper diary methods, as exact location coordinates of trip destinations, trip routes and travel times can be recorded. GPS-based data collection is performed using dedicated data loggers or smartphones. The main bottleneck with GPS is battery drain. On current battery technology, mobile GPS logging typically lasts 4 hours, which is insufficient to follow a person throughout a day. GPS also only works outdoors with a clear satellite view and is unable to follow activity indoors (e.g. shopping, car parks) and in built-up urban areas. Gong et al 2012 describes a GPS/GIS (Geographic Information System) for travel mode detection. They introduce a high level GIS interpretation to setup a rule based system which interprets speed and proximity patterns around locations where chances are high that users change from transport mode (e.g. stations). A disadvantage is that this system, by design, only works when a GPS system is available (the GIS rules also need spatial information). As a GPS system is power consuming this poses issues on the possible duration of the logging. A second disadvantage is that the rules only work in strict well defined cases.

Another solution exists in the usage of the accelerometer sensor, which is present in current smartphones or through the use of ad-hoc sensors. In this approach, 3D-accelerometer data is used to identify the transportation mode of the user (pedestrian, bicycle, car) through pattern recognition. Being more battery-conservative, logging can be performed over long periods of time while the user carries the device or smartphone in his pocket. Accuracy depends on the number transport mode classes and the sampling frequency used and varies between 70 and 90%. In this way, a daily travel pattern of a user (tour) can be segmented into different trip legs along the time axis, each belonging to a different transport mode. Main drawback of accelerometer tracking is that time logging is insufficient for detailed reporting in behavior studies. Without location data, the purpose of trip cannot be identified (e.g. work, school, shop) and need to be queried additionally from the user. Another difficulty is the reporting of change of transport mode. While accelerometer logging can report mode changes at given points in time, they cannot identify waiting times at mode changes. E.g. a commuter walking to a bus station to catch his bus will be seen walking and changing to a bus. The time spent waiting at the bus station can typically not be identified as this is classified as walking (within the station). Wait times are however crucial in different applications like the management of public transport.

Manzoni et al 2010 report such a transportation mode classification system based on accelerometer patterns. The accuracy of this system is reported to be 82% however this system only identifies the transport mode.

As mentioned previously GPS poses heavy power constraints on tracking systems. FP7 sunset reports on a battery conservative sampling strategy to collect GPS measurements from a mobile device. It uses low-sampled GPS polling to detect movement, which can trigger higher frequency polling. However also here the system only identifies the transport mode.

Current technology does not allow to unambiguously observe a person's transportation mode/trip purpose/etc. . . . One has to rely on sensor measurements like accelerometer, gps, . . . to get an indication of this state. Clearly, those sensor outputs are the result of a stochastic process and it is rarely possible to determine the true state with absolute confidence. Furthermore, it is clear that knowing only the transport mode is often insufficient for mobility studies.

Therefore there is still room for improvement for systems and methods trying to solve the problem of constructing activity behavior models of people in domains like mobility and retail.

SUMMARY OF THE INVENTION

It is an object of embodiments of the present invention to provide good devices, systems and methods for gathering and processing activity information from one or more users and/or objects.

It is an advantage of embodiments of the current invention that they enable detailed reporting on indoor as well as outdoor behavior in terms of time, location, transport mode (changes) and purpose. This as opposed to state of the art systems that analyze the data and classify the data corresponding with the different transport modes. Higher level parsing however is not possible in these state of the art systems. State of the art systems do not enter into detail around higher level parsing for mobility trips. This higher level parsing however reveals extra interesting information as: the purpose associated with the detected transport mode, waiting times information, erroneous or over segmentation of trips, i.e. portions of routes along which a user travels in the same transportation mode.

It is an advantage of embodiments of the present invention that markers can be used to identify activity or transportation mode transitions.

It is an advantage of embodiments of the present invention that a robust segmentation of the continuously monitored data is possible. In embodiments of the present invention this segmentation can be done in behavior clusters and trips, also making use of marker information.

It is an advantage of embodiments of the current invention that an easy, user friendly annotation of recurrent patterns is possible.

It is an advantage of embodiments of the present invention that no spatial information is required for detecting the profile, although if available, such information can be used. Embodiments of the present invention not requiring spatial information have an additional advantage as the use of a GPS system poses heavy power requirements on a battery powered system. Typically during mobile GPS logging the battery lifetime is around 4 hours which is insufficient to follow a person during a whole day. Therefore it is an advantage of embodiments of the present invention that a person can be followed during a whole day. Besides it is also an advantage of embodiments of the present invention that, next to outdoor activity, also indoor activity can be followed.

It is an advantage of embodiments of the present invention that a broad set of activities can be identified. In an embodiment of the present invention one activity might be walking around in a station while waiting for a vehicle to arrive another activity might be walking from one place to a destination place. It is an advantage of embodiments of the current invention that these activities can be distinguished as this adds important information when used in for example mobility studies.

It is an advantage of embodiments of the present invention that a survey analysis can easily be rephrased, as basic data can be stored, which can be related in a plurality of ways and also be questioned in a plurality of ways.

The above objective is accomplished by a method and device according to the present invention.

The present invention relates to a client device for gathering mobility information of a user, the device comprising a sensor data obtaining means for collecting sensor data representative for transportation-characteristic information of a user and a marker information obtaining means for collecting marker information, the marker information being related to an environmental characteristic of the user or an event occurring for the user not determined based on a transportation characteristic. The system furthermore comprises a processing means for combining the transportation-characteristic information of the user and the marker information so as to be able to determine based thereon mobility information of the user, and an output means for outputting the combined transportation-characteristic information and the marker information.

The processing means may be programmed for combining the transportation-characteristic information and the marker information by time-aligning the transportation-characteristic information and the marker information.

It is an advantage of embodiments according to the present invention that accurate determination of the transportation mode can be obtained. It is an advantage of embodiments of the present invention that distinguishing between relevant movement and non-relevant movement can be made in a user-friendly way. It is an advantage of embodiments of the present invention that the required user interaction can be drastically reduced, resulting in an improved logging.

It is an advantage of embodiments of the current invention that it allows continuous logging of (travel) behavior over long periods of time. These periods can extend up to months and even years.

The marker information obtaining means may comprise one or more of an interface for reading NFC tags, a GPS interface, a WIFI interface, a bluetooth interface, a cell phone interface or a time module interface.

The marker information obtaining means may comprise a detection means for detecting information regarding internet usage.

It is an advantage of embodiments of the current invention that they allow user-friendly logging in terms of battery consumption of the logging device as well as in terms of expected user input. The use of markers allows the system to detect activity transitions. Markers can be user defined as a combination of external inputs of the logging system and the system interface allows user-friendly definition of these markers. The external inputs of the logging system are mostly automated, but in case an external input is expected from the user, the logging system allows a user friendly input.

It is an advantage of embodiments according to the present invention that non-transportation characterized environmental parameters or activity can be determined in a plurality of ways such as for example based on tag information, position information, time information, activity information such as buying or selling something, starting or stopping an activity, entering or leaving a particular place or event, etc. It is an advantage of embodiments according to the present invention that noting down the activity or position is not required anymore from the user but that the marker information allows for obtaining such activity or position information.

The sensor data obtaining means may be an accelerometer or another transportation determining device. It is an advantage of embodiments according to the present invention that automated capturing of transportation-characteristic information can be based on known technologies, such as transportation determination based on GPS or accelerometry.

The processing means may be adapted for determining based on the marker information an identified marker representative of an activity of the user or an environmental parameter of the user.

The processing means may be adapted for deriving a transition in mobility behavior based on the combination of the identified marker and transportation-characteristic information.

The processing means may be adapted for determining the identified marker based on a comparison of the marker information with a marker database.

The processing means may be adapted for determining mobility related information based on the identified marker and the transportation-characteristic information.

The processing means may be adapted for determining a transportation mode or a transition between two different modes of transportation using a transportation mode database.

The processing means may be adapted for taking into account a probability that the identified marker occurs in combination with the determined transportation mode or the determined transportation mode transition.

The system may be a smart phone.

The device may be implemented as a computer application.

The present invention also relates to a server device for gathering mobility information of a user, the device comprising an input means for receiving a combination of sensor data representative for transportation-characteristic information of a user and marker information being related to an environmental characteristic of the user or an activity of the user not determined based on a transportation characteristic, and a processing means for determining based on said combination mobility information of the user.

The input means may be adapted for receiving the combination comprising time-aligned transportation-characteristic information and marker information.

The processing means may be adapted for determining mobility related information based on the marker information and the transportation-characteristic information.

The processing means may be adapted for deriving a transition in mobility behaviour.

The processing means furthermore may be adapted for determining based on the marker information an identified marker representative of an activity of the user or an environmental parameter of the user.

The present invention also relates to a method for gathering mobility information of a user, the method comprising collecting sensor data representative for transportation-characteristic information of a user, collecting marker information, the marker information being related to an environmental characteristic of the user or an activity of the user not determined based on a transportation characteristic, combining the transportation-characteristic information of the user and the marker information so as to be able to determine based thereon mobility information of the user, and outputting the combined transportation-characteristic information and the marker information.

The present invention also relates to a method for gathering mobility information of a user, the method comprising receiving a combination of sensor data representative for transportation-characteristic information of a user and marker information being related to an environmental characteristic of the user or an activity of the user not determined based on a transportation characteristic, and determining based on said combination mobility information of the user.

The present invention also relates to a computer program product for performing, when run on a computing device, a method as described above.

The present invention furthermore relates to the transmission of a computer program product over a local or wide area network.

A data carrier comprising a computer program product as described above.

The present invention also relates to the use of a device as described above for obtaining a mobility information for a user.

The present invention furthermore relates to the use of a device as described above for obtaining a mobility map of an area.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
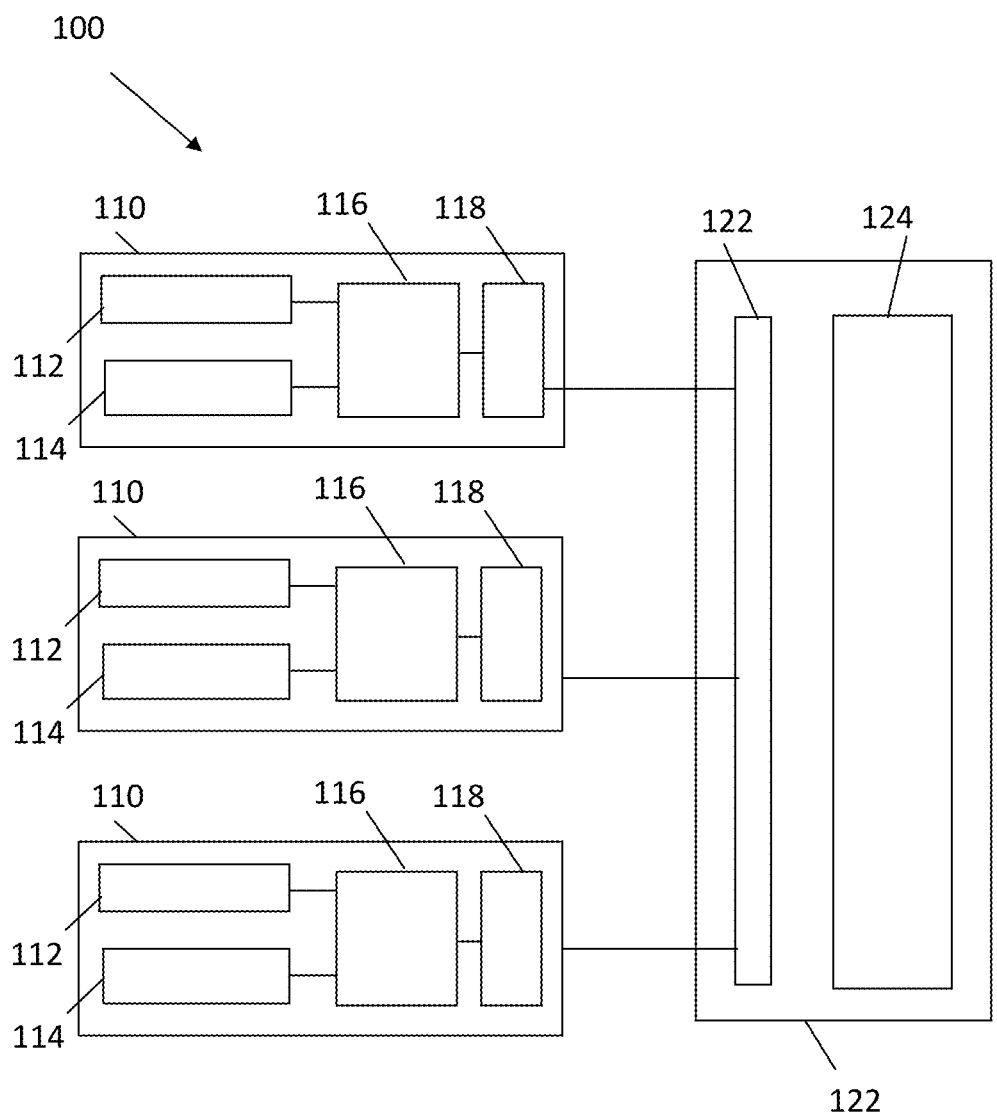
FIG. 1 shows a schematic representation of an exemplary device according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the current invention reference is made to a mode or transportation mode reference is made to the way somebody or something is moving or is being transported. This can be, but is not limited to, by train, by car, by bus, by boat, by plane, by walking, by cycling.

Where in embodiments of the current invention reference is made to an activity reference is made to a transport mode in combination with the purpose of the transport mode. For example it can be that a person is walking from home to school or it can be that a person is walking around while waiting on the bus. In terms of transport mode the previous examples are the same however in terms of activity the previous examples are different.

Where in embodiments of the current invention reference is made to a transportation mode transition or an activity transition reference is made to a change from one transportation mode or one activity to another. It is an advantage of embodiments of the present invention that markers can be defined which allow to identify transportation mode transitions or activity transitions.

Where in embodiments of the present invention reference is made to marker information reference is made to a combination of external information inputs or even to one single external information input. As such marker information allows a user or a survey client to identify key events within a daily travel and behavior pattern. The marker information and the presence of a marker may typically be associated with the start and/or the end and/or the duration of a transportation mode or activity whereby the association is characterized with a certain probability. A marker can be a location, a moment in time, an event or any combination thereof.

Markers, as defined here, are the result of a stochastic process. A marker event typically happens around the time of a transition, but the exact time can vary, and the event might not always happen at a transition or might happen more than once. Markers may define a transition of activity or transportation mode. Markers thus defines possible changes of activity that can occur at the given location, time and/or event. E.g. a marker at a bus stop signals increased possibility of mode change from pedestrian to bus transport or vice/versa.

The markers thus can be sensor measurements such as nfc, gps, wifi, Bluetooth, cell, time based measurements, but alternatively also can be interaction of the app or another app with the user such as for example pressing a start or stop button, performing a mobile payment, or information stemming from other systems, such as for example payment data, cell phone mast data, gps data loggers, loading data, etc.

In a first aspect, the present invention relates to a client device for gathering mobility information of a user. Such gathering mobility information may comprise collecting and/or analyzing information along the trajectory of one or more users or objects. It may be the basis for a mobility mapping of a community or for an area. Embodiments according to the present invention can be used for analyzing all kinds of collected external information. Besides low level results, e.g. the transport modes used during the trajectory, also high level analysis results are possible, e.g. the goal of the transport modes used during the trajectory. The transport mode together with its goal is defined as an activity. Embodiments of the present invention allow to close the semantic gap between low-level data logging and reporting activity behavior. The client device typically may be part of a larger mobility mapping system comprising a plurality of client devices and a server device co-operating for gathering and processing mobility information. As for mobility studies it is important to monitor the time a user spends on different transport modes (pedestrian, bicycle, public transport, car), embodiments according to the present invention can advantageously assist in determining such mobility behavior.

According to embodiments of the present invention, the device comprises a sensor data obtaining means for collecting sensor data representative for transportation-characteristic information of a user and a marker information obtaining means for collecting marker information, the marker information being related to an environmental characteristic of the user or an activity of the user not determined based on a transportation characteristic. The device thus may be a logging device for logging information or may be a device adapted for receiving logged information. The device also comprises a processing means for combining the transportation-characteristic information of the user and the marker information so as to be able to determine based thereon mobility information of the user. The device also comprises an output means for outputting the combined transportation-characteristic information and the marker information.

By way of illustration, embodiments of the present invention not being limited thereto, standard and optional features of components of an exemplary device for gathering information will be discussed below, with reference to the drawings.

The client device comprises a sensor data obtaining means for collecting sensor data representative for transportation-characteristic information of a user and a marker information obtaining means for collecting marker information related to an environmental characteristic of the user or an activity of the user that is not determined based on transportation characteristic. Transportation characteristic thereby means that it is based on signals determined by transportation of the user or object. The sensor data representative for transportation-characteristic information may e.g. be accelerometer data, e.g. such as accelerometer data as obtainable using an accelerometer present in a mobile device such as a mobile phone, GPS transportation information providing information of the transportation that the user or an object is undergoing, etc. The sensor data obtaining means thereby may be an input channel for receiving such data, i.e. it may be a software component, e.g. part of a computer application, but it may also comprise the hardware components required for recording such data, such as for example an accelerometer, a GPS transportation determining interface, etc. The client device thus may be a logging device.

The marker information obtaining means may be implemented as a software component, e.g. as a component in a computer application. Alternatively or in addition thereto, the marker information obtaining means also may comprise the hardware components required for recording marker information. The software or hardware components may be implemented as interfaces for collecting marker information. The device may comprise one or more than one interface 102 to collect marker information. Examples of such marker information obtaining means, the examples being not limited thereto, may be a wifi interface, a bluetooth interface, a nfc tag reading interface, a time interface, a GPS interface, a wireless network interface identifying a position and a timing, etc. Marker information may alternatively also be interaction of the app or another app with the user such as for example pressing a start or stop button, performing a mobile payment, or information stemming from other systems, such as for example payment data, cell phone mast data, gps data loggers, loading data, etc.

The marker may more generally relate to any observable change of human behavior. Some further particular examples of marker information, related to internet use modes, are given below.

A first particular example of marker information is a marker encoding a transition from non-active to internet use, triggered by sms-ticketing. The event of paying an SMS-ticket for public transport can be used to mark a possible change from non-activity to internet use (hidden state) based on accelerometer data (observation). In this context, the consumer being in a comfortable, hands-free setting sitting in the bus or train, possibly with wifi-access, makes it more probable for a consumer to consult internet on his smartphone. The accelerometer data can be used to determine a person sitting still (even when moving in a car or bus) versus walking/biking. The marker in addition does not define the context when internet will be used but marks the event that signals a possible change of surfing behavior.

A second particular example of marker information is a marker encoding transitions from non-active to internet use, triggered by transit stops. The event of passing a public transport stop can be used to mark a possible change from non-activity to internet use (hidden state) based on accelerometer data (observation). This is a similar context as the previous example only more complex as a transit stop can be passed by car or on foot without necessarily boarding the bus. To make the transition matrix relevant and discriminant, one would combine transport mode in the hidden states together with internet usage.

A third particular example of marker information is a marker encoding transition between emotional moods, triggered by NFC readout on smart watch. The event of a smartwatch NFC readout in a movie multiplex can be used to mark a possible change of emotional mood (hidden state) based on heart rate readouts from a smart watch (observation). Possible moods can be defined by the movies playing in the multiplex (neutral, relax, happy, stress, . . . ) and possible mood transitions can be defined accordingly. The NFC read out can be associated with an advertising billboard within the multiplex site. The marker helps to further differentiate the change in emotional state based on the heart rate. It does not define the emotional state as such.

The logging device can record the input from the one or more different interfaces. The device furthermore may comprise a user interface for manually introducing information, e.g. in a learning phase or when the user wishes to add additional information, or for marking events for which no other appropriate interface exists (yet).

FIG. 1 illustrates a client device 110, being part of a larger mobility mapping system 100 also comprising a server device 120. In the client device 110, the sensor data obtaining means 112 is shown, as well as a plurality of marker information obtaining means 114.

The information collection may be performed online as well as offline. The information from the sensor data obtaining means and the marker information is sent to the processing means using e.g. a datalink between these components.

The client device furthermore comprises a processing means 116 for combining the sensor data and the marker information. Such a processing means 116 may be implemented in a software manner or a hardware manner. The amount of processing that is performed on the client device for deriving from the sensor data and the marker information mobility information may vary, depending on the embodiment envisaged. The processing means may comprise a marker information processing means and/or an activity or transportation mode processing means, which will be described later with reference to the examples. The processing means may be based on database analysis, on use of look-up tables, use of a neural network, use of predetermined algorithms and/or rules, etc. The database, look-up table, neural network or parameters for the predetermine algorithms and rules may be pre-defined or can be configured by a user. The processing means may be adapted for combining the marker information and the transportation-characteristic information by at least time-aligning the marker information and the transportation-characteristic information. This may be based on time stamps recorded when recording the marker information and when recording the transportation-characteristic information, based on time dependent storing from both types of information to a same storage place, e.g. memory, . . . .

The processing also may comprise, at the client side or at the server side, more complex analysis, e.g. for deriving a transition in mobility, based on filtering techniques such as the application of a Markov model. By way of illustration, embodiments not being limited thereto, an example of a part of the processing that can be performed is shown in example four described below.

A plurality of examples and illustrations will be given below. The processing may be implemented as hardware, as well as in software. The processing means may furthermore be adapted for compressing the data, in order to limit the amount of data traffic required.

The client device also comprises an output means 118 for outputting the combined sensor data and the marker information. Depending on the amount of processing that is done on the client device, the output means will be adapted for outputting combined sensor data and marker information as the mere combination of the sensor data and marker information, will be adapted for outputting combined sensor data and marker information as sensor data and an identified marker, will be adapted for outputting combined sensor data and marker information as an activity and activity transition, . . . .

In certain embodiments of the present invention such a client device 110 may for example be a smartphone having a graphical user interface allowing the user to report a marker. Reporting of a marker can be done manually, by tagging, by monitoring a payment transaction, by monitoring a data input or data receiving action, etc. User activated markers may be collected through a graphical user interface present in the client device, through which a user actively reports his/her markers to the system. Such user activated markers may for example be frequently visited spots which are annotated with their purpose.

Figure 2:
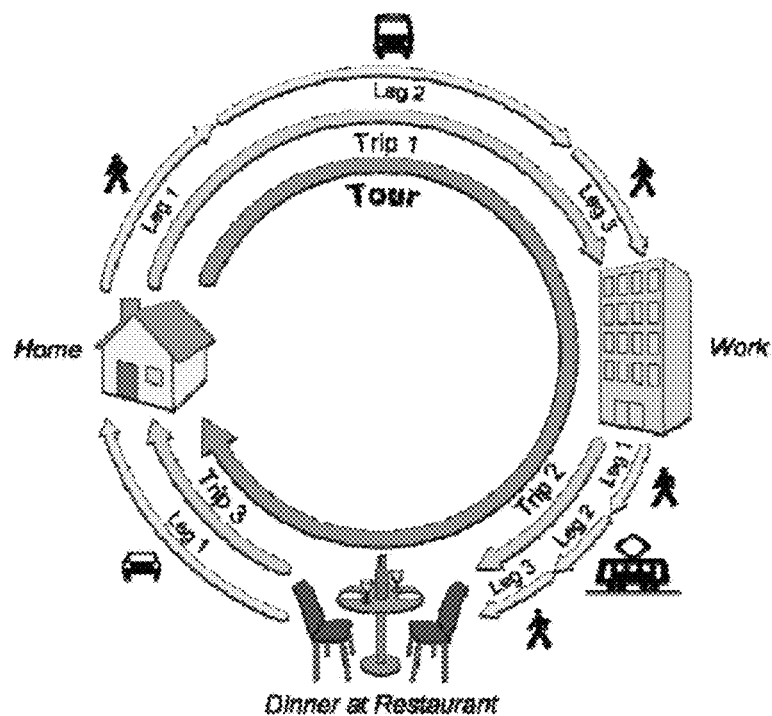
FIG. 2 illustrates a possible subdivision of a user's trajectory whereby a tour is subdivided into trips and trips are subdivided into legs according to an embodiment of the present invention.

Other examples of markers can be as illustrated in FIG. 2. FIG. 2 is a possible division of a trajectory made by a user. In this example the whole trajectory is called a tour. A tour is divided into trips and a trip may be divided into legs whereby each leg corresponds with an activity being a transport mode in combination with a goal.

One marker could indicate a school. The marker could be some signal coming from the school captured by the client device. Whenever a user enters the marker environment a trip leg is stopped, i.e. this means the end of the previous activity now recognized as "going to school". Whenever the user leaves the marker environment indicated by the same signal as above not being captured anymore by the client device this means the beginning of a new activity or trip leg as it is called in FIG. 2.

Another marker could indicate a bus stop. Whenever a user enters the marker environment, this indicates the end of a trip leg/activity. Leaving the marker environment indicates the start of a new trip leg/activity. The time between the two trip legs/activities is annotated as waiting time. It is an advantage of embodiments of the current invention that it allows to recognize this period as waiting time whereas in the prior art systems and methods based on a movement sensor will indicate the activity as walking instead of waiting.

Another marker could indicate a train. For a train with a WIFI hotspot the marker could be the WIFI signal captured by the logging device. Moreover as a WIFI hotspot can be identified the current train set used can be identified when correctly specified in the activity database.

Another set of markers can be present in a shopping malls or other indoor situations where markers can be used to annotate visits to specific shops.

Figure 3:
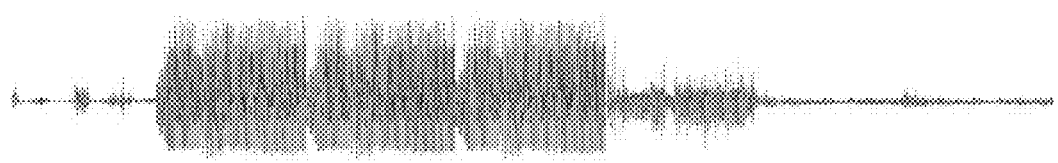
FIG. 3 illustrates an accelerometer log taken by a logging device having an accelerometer interface, as can be used in an embodiment according to the present invention.

In embodiments of the present invention markers are used to stabilize transport mode and aid in trip segmentation. In certain embodiments of the current invention battery efficient techniques are based on accelerometer pattern classification as these systems can run for a time order longer than similar techniques based on GPS only. Especially for deployment on mobile devices and for long term tracking of user behavior this is an important aspect. FIG. 3 illustrates an accelerometer log taken by a logging device having an accelerometer interface. It illustrates the log differences between different transport modes (also present on the figure). In addition, markers are an easy way for users to report on their recurrent patterns without having to note each time their trip purpose and start and stop time. Markers indicate activity transitions and give for example additional meaning to the log in FIG. 3. Whenever a user enters an environment defined by a marker, the marker can be used to annotate time and purpose accordingly.

In a second aspect, the present invention relates to a server device for gathering mobility information of a user. Such a server device may be used with a plurality of clients, e.g. for receiving information from the plurality of clients. The server device according to embodiments of the present invention comprises an input means for receiving a combination of sensor data representative for transportation-characteristic information of a user and marker information being related to an environmental characteristic of the user or an activity of the user not determined based on a transportation characteristic, and a processing means for determining based on said combination mobility information of the user. By way of illustration, embodiments of the present invention not being limited thereto, FIG. 1 also indicates the server device 120, which comprises an input means 122 and a processing means 124. The amount of processing that is performed at the server level can vary over different embodiments. Different examples and embodiments thereof will be illustrated below.

In a third aspect, the present invention relates to a method for gathering mobility information of a user. Such a method may be advantageously performed using a client device as described in the first aspect, although embodiments of the present invention are not limited thereto. The method according to embodiments of the present invention may be a method performed at a client side of a mobility mapping system. According to embodiments of the present invention, the method comprises collecting sensor data representative for transportation-characteristic information of a user and collecting marker information, the marker information being related to an environmental characteristic of the user or an activity of the user not determined based on a transportation characteristic. Gathering marker information, e.g. by scanning a tag, may e.g. be stimulated using incentives, gaming design, sustainability app etc.

The method furthermore comprises combining the transportation-characteristic information of the user and the marker information so as to be able to determine based thereon mobility information of the user and outputting the combined transportation-characteristic information and the marker information. Combining the transportation characteristic information and the marker information may comprise a mere combination. In addition thereto, such combining also may comprise partly processing of the information. In one embodiment, the combining may include processing the marker information for identifying a marker. In addition thereto, in some embodiments, the combining also may include processing of the marker and the transportation-characteristic to identify a transportation mode, a transportation mode transition, an activity or an activity transition. The method may be a computer-implemented method.

In a fourth aspect, the present invention relates to a method for gathering mobility information of a user, whereby the method is advantageously performed using a server device as described in the second aspect, although embodiments of the present invention are not limited thereto. The method according to embodiments of the present invention may be a method performed at a server side of a mobility mapping system. According to embodiments of the present invention, the method comprises receiving a combination of sensor data representative for transportation-characteristic information of a user and marker information being related to an environmental characteristic of the user or an activity of the user not determined based on a transportation characteristic. The method also comprises determining based on said combination mobility information of the user. The type of combined information that is received, may vary for different embodiments. In some embodiments the information is received as merely combined transportation-characteristic data and marker information, and the method also comprises processing the information. Such processing may comprise identifying a marker in the marker information. Such identifying may comprise using a marker rule database, using a predetermined algorithm, a neural network, a specific filter, etc. The processing also may comprise deriving a transportation mode, a transportation mode transition, an activity or an activity transition, based on the transportation-characteristic data and identified markers if present. The latter may include using a database, using a predetermined algorithm, a neural network, a specific filter, etc.

The method also may comprise dividing a trajectory of a user or object and assign the corresponding transportation modes to the segments of the trajectory. The method also may comprise using such information for performing mobility mapping of a person, a group of persons or for an area (e.g. for a city).

Further methods steps may correspond with the functionality provided by features of a server device as described in the second aspect.

In both the third and the fourth aspect, the methods may comprise initializing the marker and or activity or transportation mode databases. The latter may include updating the database with a list of activities and defining markers which can be associated with the start and/or the end and/or the duration of an activity. The activity database thus may link the presence of a marker with the transition of an activity or with the presence of an activity. The user can also initialize the activity database with the probability the mentioned link occurs. More particularly, a certain marker could occur in combination with more than one transportation mode, transportation mode switch, activity or activity switch and a probability may be provided indicative of the chance that a marker gives rise to a certain transportation mode, transportation mode switch, activity or activity switch.

In certain embodiments of the third and the fourth aspect, the initialization step can be performed through an interface of a processing means on a client side or a server side. In certain embodiments of the current invention the user can reinitialize or update the activity database at any time during the method, for operating it using the best available information. In other embodiments of the current invention the "marker/activity definition" step is not required because a predefined set is already present.

It is to be noticed that transmission of data can be performed off-line as well as online to the server (receiving) or from the client (submitting).

Figure 4:
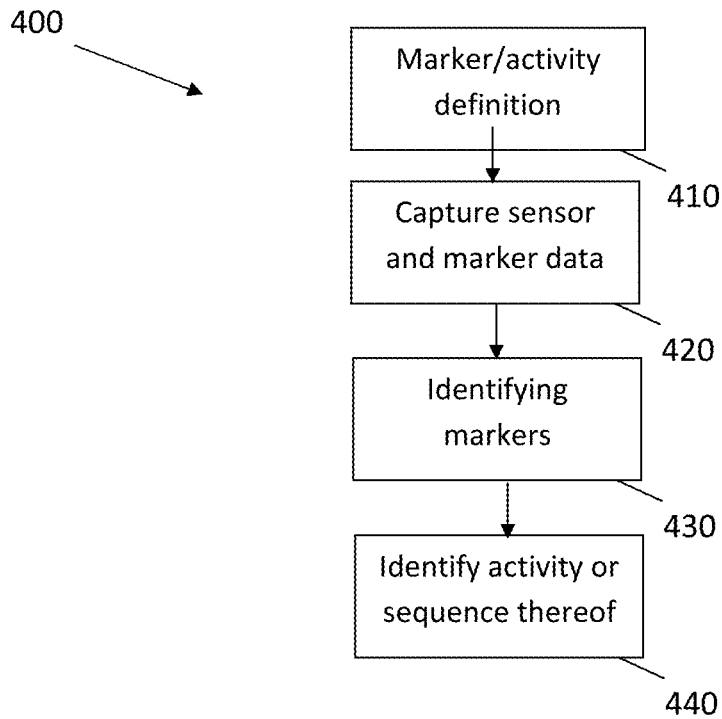
FIG. 4 illustrates a series of steps of a first method according to an embodiment of the present invention.

By way of illustration, a number of particular method embodiments is described with reference to FIG. 4, FIG. 5 and FIG. 6. Such method embodiments may express a combination of a method according to the third aspect, and a method according to the fourth aspect, e.g. described the method steps applied at the client device as well as the method steps applied at the server device. In FIG. 4, a method 400 illustrating a plurality of steps is shown. The method comprises in a first step 410 wherein the marker and/or the activity database are defined. The latter can e.g. be performed using an initialization process. The method also comprises capturing transportation-characteristic data as well as marker information, as indicated by step 420. In a following step 430, from the marker information, markers are identified, typically using a marker database as defined in the first step. Based on the obtained transportation characteristic and on the identified markers (if any), the transportation mode, transportation mode transition, activity or activity transition or a sequence thereof is identified.

Figure 5:
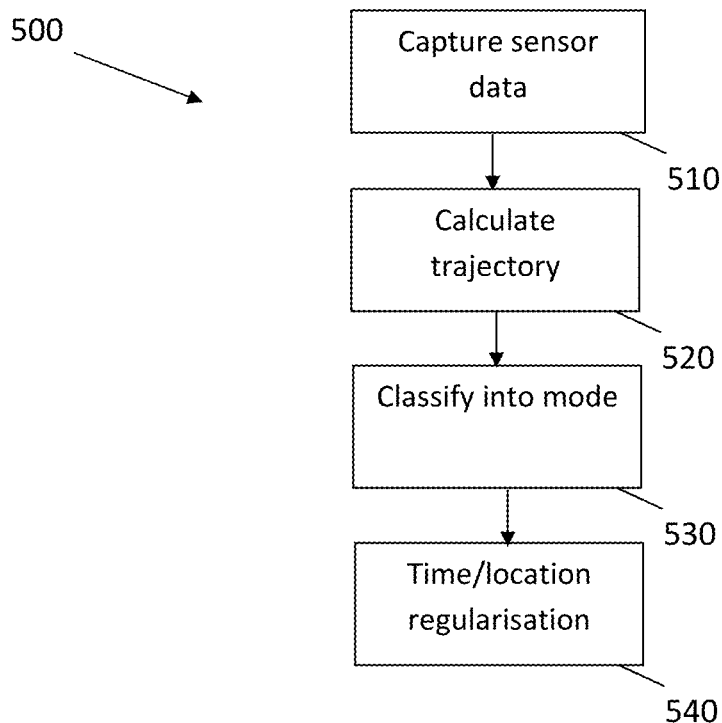
FIG. 5 illustrates a series of steps of a second method according to an embodiment of the present invention.

In FIG. 5, a similar embodiment is shown, wherein the external information is based on time or location registration instead of other markers. This again allows to obtain a better identification of the transportation mode, activity, transportation mode transition or activity transition, in the exemplary embodiment illustrated as a regularization afterwards. The method 500 comprises the step of capturing transportation characteristic data in step 510, the calculation of transportation trajectory (expressed as a feature vector) based thereon in step 520, the determination of a transportation mode based thereon 530 and the regularization using time or location based information, i.e. applying a correction of the transportation mode if it does not correspond with time or location information that is obtained in step 540.

Figure 6:
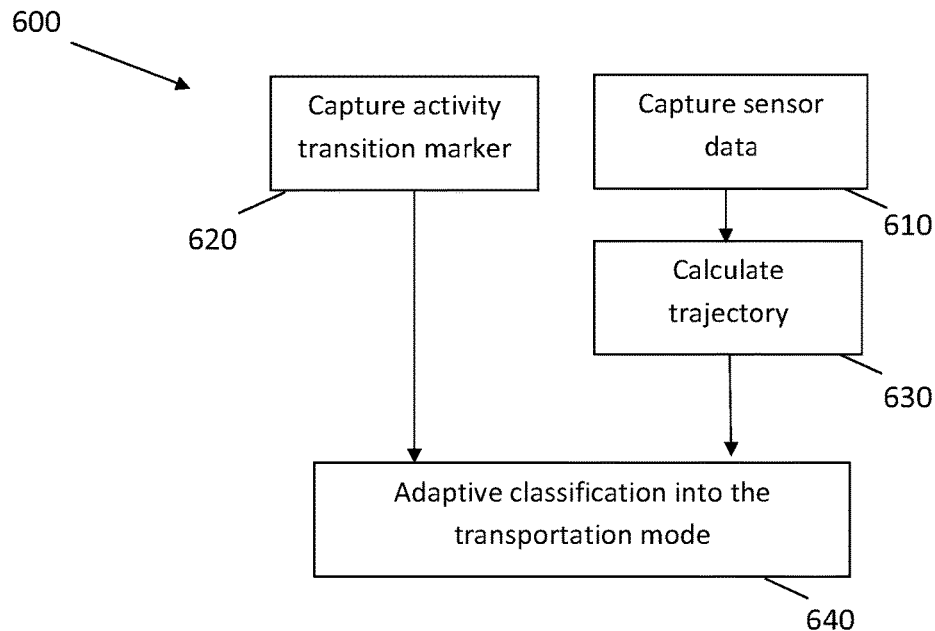
FIG. 6 illustrates a series of steps of a third method according to an embodiment of the present invention.

In FIG. 6 another embodiment is described, wherein a method 600 for gathering information comprises capturing of transportation characteristic data 610, capturing of marker information 620, calculating in step 630 a transportation trajectory (expressed as a feature vector) based on the obtained transportation characteristic data and combining the obtained marker information and the transportation trajectory for classifying as the appropriate transportation mode or activity in step 640.

In yet another aspect, the present invention relates to the use of a client device according to the first aspect or a server device according to the second aspect for determining a mobility profile of a user, a group of users or for a certain area (e.g. a city).

In still another aspect, the above described system embodiments may correspond with an implementation of the method embodiments as a computer implemented invention in a processor. Such a processor includes at least one programmable computing component coupled to a memory subsystem that includes at least one form of memory, e.g., RAM, ROM, and so forth. It is to be noted that the computing component or computing components may be a general purpose, or a special purpose computing component, and may be for inclusion in a device, e.g., a chip that has other components that perform other functions. Thus, one or more aspects of the present invention can be implemented in digital electronic circuitry, or in computer hardware, firmware, software, or in combinations of them. While a processor as such is prior art, a system that includes the instructions to implement aspects of the methods is not prior art. The present invention thus also includes a computer program product which provides the functionality of any of the methods according to the present invention when executed on a computing device. In another aspect, the present invention relates to a data carrier for carrying a computer program product. Such a data carrier may comprise a computer program product tangibly embodied thereon and may carry machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

In yet another aspect, the present invention relates to the use of a set of tags for identifying marker information for gathering mobility information of at least one user. The set of tags may for example be provide as a plurality of stickers, although embodiments of the present invention are not limited thereto and other types of tags also could be used. The tags may e.g. be implemented as bar or QR codes. Such a set of tags can for example be distributed to users, e.g. a user involved in a mobility mapping project.

By way of illustration, the present invention not being limited thereto, a number of examples are described below, illustrating standard and/or optional features and advantages of some embodiments of the present invention.

Figure 7:
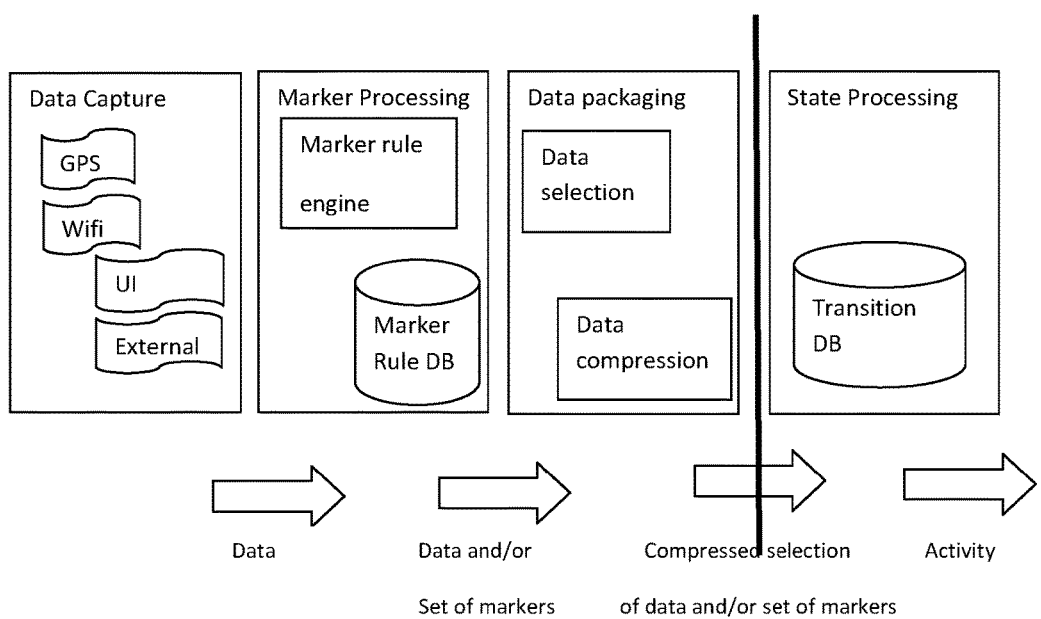
FIGS. 7 to 9 illustrates a client device implementation according to an embodiment of the present invention, wherein the division of tasks between client(s) and server is different for the three illustrations.

In a first example, a client device and a server device are discussed, whereby the processing is distributed over both the client device and the server device. A schematic representation is shown in FIG. 7. The client device, schematically illustrated on the left side of FIG. 7 comprises a data capture part, a marker information processing part, and a data packaging part. The data capture part of the present example comprises a GPS, a WIFI, a user interface and a means for capturing other marker information, i.e. information not determined based on movement or transportation of the user or the object. According to the present example, the client device comprises a marker information processing means having a marker rule engine and a marker rule database. The marker rule database is a database of rules for marker information. The marker rule engine uses the marker rule database for identifying whether marker information is representative for an effective marker, referred to as identified marker, e.g. based on a comparison of the marker information with the marker rule database. Some examples of marker information allowing identification of a marker are the detection of a particular tag, the marker rule database thereby identifying the tag as corresponding with a particular action, the identification of a payment, the marker rule database thereby identifying a shopping action of the user the ordering of parking ticket, the marker rule database thereby identifying a car parking action of the user, etc.

In the present example, the server device comprises a transition or mode processing means comprising a transportation mode database for encoding all state transportation mode probabilities or transportation mode transition probabilities, i.e. the probability that an activity or transportation mode or switch thereof has occurred or will occur, given a certain marker. The transportation processing means thereby may take into account a probability of occurrence, taking into account the identified marker and the transportation-characteristic data. E.g. if the identified marker is representative for buying a bus ticket but the transportation-characteristic data before buying the bus ticket and after buying the bus ticket both seems to identify walking, the transition from walking in a first trajectory to walking in a second trajectory is far more unlikely than the transition from walking in a first trajectory to taking the bus in a second trajectory. Such information is taken into account for determining transportation modes as well as transportation switches or activity modes as well as activity switches. In the present example, the processing means thus is a distributed processing means whereby marker identification is implemented at the client side typically over a plurality of clients and transportation mode or activity processing is performed on the server side.

The transportation mode database may in one example be conceived for containing a list of activities (e.g. taking a bus, walking from home to the bus station) and for each activity a marker is associated with the start and/or the end and/or the duration of the activity (e.g. the activity of taking a bus is associated with a marker being the wifi hotspot in the bus, this marker indicates an activity transition namely entering or leaving the bus and is also active during the "bus activity"; the activity walking from home to the bus station could be associated with a marker being an nfc tag at the front door of the house in combination with the signature of walking generated by a motion sensor). Next to the list of activities and the associated markers, the activity database is also conceived for storing a probability value corresponding with the probability the marker is associated with the corresponding transportation mode, transportation mode transition, activity or activity transition. By not necessarily relying on GPS signatures, markers can be made much more battery efficient.

According to the present example, the client device is a smartphone that is capturing raw data comprising marker information and transportation-characteristic data, identifying a possible marker event from the raw data, packaging the transportation-characteristic data and possible identified marker(s) and sending it to a server device. On the server side, the processing means processes the transportation-characteristic data and if a marker is present it is analysed whether the marker can be associated with the transportation-characteristic data for identifying a transportation mode a transportation mode transition, an activity or an activity transition according to the transition rules.

Figure 8:
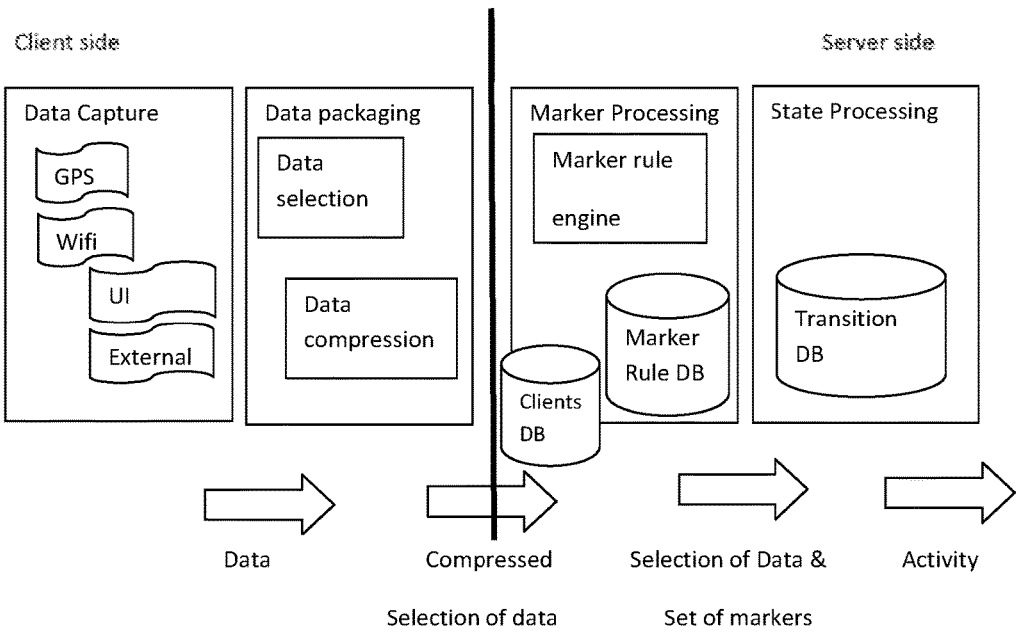

In a second example, a similar system as in the first example is described, but the processing is distributed differently, as schematically illustrated in FIG. 8. The processing at the client side is substantially reduced and most of the processing is performed at the server side. More particularly, the marker processing and the transition or activity processing is performed at the server side. In such an example, the information flow is as following:

A smartphone captures the transportation-characteristic data and the marker information.

The combined information is packaged and sent to the server.

The server processes the marker information and identifies markers and associated state transitions.

The server processes the transportation-characteristic data and markers into an activity, an activity transition, a transportation mode or a transportation mode transition.

In the present example, the system furthermore comprises a "Clients database" containing aggregated data over specific user segments. This can be used as marker definitions (based on general behavior) in addition to user defined markers.

Figure 9:
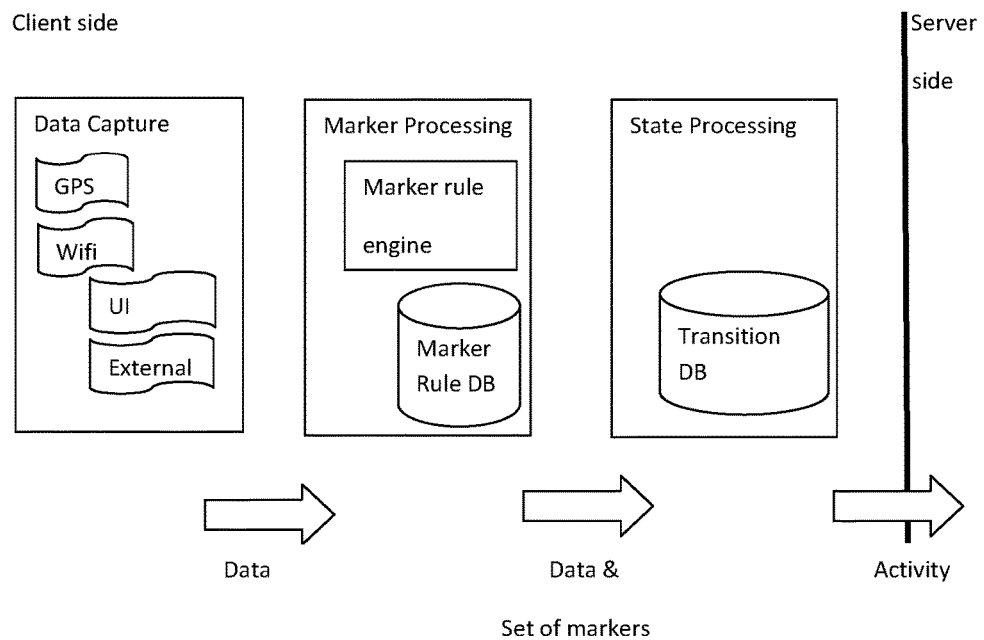

In a third example, the present invention relates to a system similar as shown in the first and second example, but the processing is performed nearly completely at the client side. A schematic representation is shown in FIG. 9. Both marker processing as well as state processing are implemented at the client side. The latter results in distributed processing, as the number of client devices typically is high, whereas typically only a single server or small group of servers is used at the server side.

In a fourth example, a particular example of processing of information, as may be implemented in embodiments of the present invention, is illustrated. The observation of a certain measurement (sensor measurement or marker events) at a certain time reveals something about the activity at that time but since the activity will not change very fast, it also gives an indication of the activity in the recent past and near future. Moreover, since certain transitions are more likely than others, knowledge about the past and or future can help interpreting the data representative of the present.

It is an advantage of at least some embodiments of the present invention that knowledge about the past and future measurements can be integrated as this leads to a more stable and reliable result. The analysis problem occurring in embodiments of the present invention can be modeled as a dynamic bayesian network. In our case, where possible activities (defined by transport modes and trip purpose) are to be determined, advantageously a hidden markov model may be used.

In a hidden markov a model, a system is being modeled consisting of hidden (i.e. unobservable) states and observable outputs. A dynamic model describes the transition probabilities to go from one activity or transportation mode to the next over time. The observation model describes the probabilities of observing a certain output. The key to a hidden markov model is that the markov property (or memoryless property) should hold. In the present context this property means that:

The output process should not depend on any state of the past or future, if the current state is known and the transition probabilities should not depend on any of the past states other than the last one.

A hidden markov model allows a number of inferences. One can calculate the probability of the current state, given all the observed outputs from the present and the past (not the future). This is called filtering and can be handled with the forward algorithm. The following formula illustrates the working of the forward algorithm:

$$p(x_t \mid y_{1:t}) = np(y_t \mid x_t) \sum_{x_{t-1}} p(x_t \mid x_{t-1}) p(x_{t-1} \mid y_{1:t-1})$$

In this formula, $x_t$ is the state at time t, $y_t$ is the observation at time t and $y_{1:t}$ are all the observations from the beginning until time t (n is a normalization factor independent of the state). The formula shows how the probability of the state at a certain time t can be calculated as a recursive process, using only the current observation, the dynamic model and the results from the previous time step.

One can also calculate the probability from a random state in the sequence, given all the observations from the past, present and future. This is called smoothing and can be handled by the forward-backward algorithm. It is based on the following formula:

$$p(x_k \mid y_{1:t}) = np(y_{k+1:t} \mid x_k) p(x_k \mid y_{1:k})$$

The last factor in this equation can be calculated with the forward algorithm as described before. The first probability can be calculated with the backward algorithm. In practice, one will be most interested in the most likely sequence of states, which can be calculated using the Viterbi algorithm.

Figure 10:
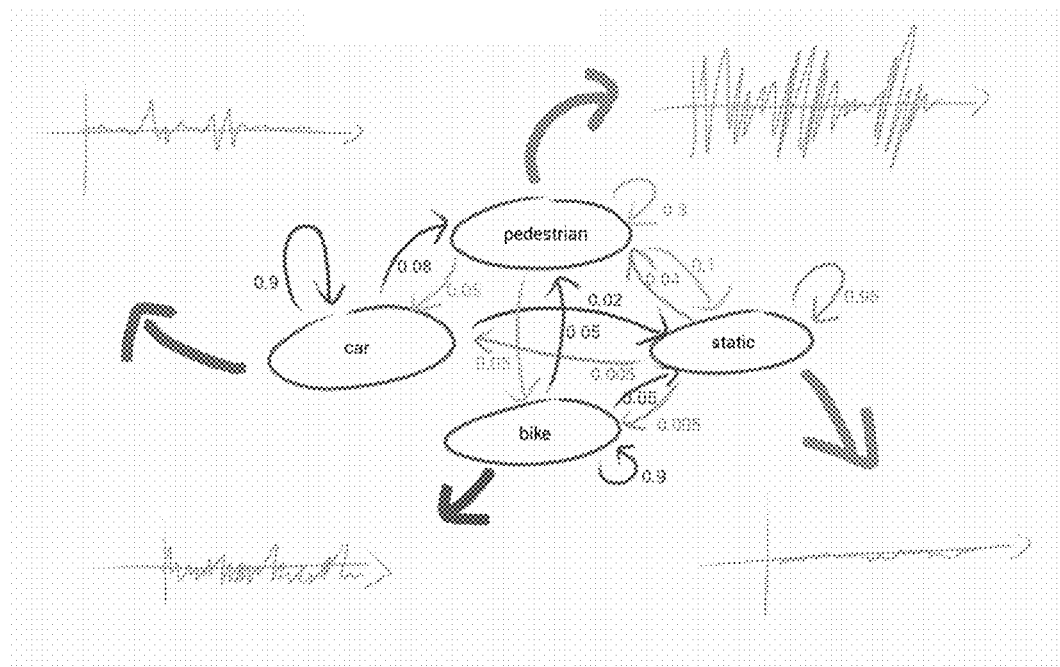
FIG. 10 illustrates an exemplary hidden markov model for classifying transportation modes or activity based on accelerometer measurements, as can be used in embodiments of the present invention.

A hidden Markov model is typically represented as a graph, with nodes representing all the possible states and directional edges representing transitions. FIG. 10 shows an example of a hidden Markov model for the modeling of transportation mode or activity based on accelerometer outputs. Here, the hidden state is the current transportation mode and the observable outputs are the accelerometer measurements.

In this example, one can for example define a transition matrix between hidden states as follows

| From | To | | | |
| --- | --- | --- | --- | --- |
| | Static | Pedestrian | Bike | Car |
| Static | 0.95 | 0.04 | 0.005 | 0.005 |
| Pedestrian | 0.1 | 0.8 | 0.05 | 0.05 |
| Bike | 0.05 | 0.05 | 0.9 | 0 |
| Car | 0.02 | 0.08 | 0 | 0.9 |

The conditional probabilities between observation y and state x in FIG. 10 are trained using supervised learning using a ground truth data set on accelerometer output.

Markers can also be represented as an observable output of a stochastic process. In the present case, markers will signal not only a current state but a transition from one state (previous) to the other (current).

Suppose there are N possible markers $m_1$ to $m_N$. At a certain time t, zero or more of those markers can be observed. Let $y_{mi,t}$ be a variable equal to 0 or 1, representing whether or not marker $m_i$ is observed at time t. If $M=\{m_i \mid i=1 \ldots N\}$ is the set of possible markers, and $y_{M,t}=[y_{m0,t}, \ldots, y_{mN,t}]$ is the observed output for all the markers stacked in an array, the probability of observing this output given the current state can be defined. Note however that using only the current transportation mode (or other current information such as trip purpose), in this case is insufficient. Indeed, the observation probabilities depend not only on the current transportation mode, but since the marker events happen most likely around the time of a transition, they also depend on the distance from the previous/next transition and the type of transition. This can be handled by adding for example the previous (and next) transportation mode and the time from the previous (and next) transition as hidden states to the markov model.

Suppose one wants to encode the current transportation mode, the previous transportation mode and the time difference from the last transition in the state variable. The state vector $x_t$ at time t, can then be written as $x_t=[v_t, v_t', d_t]$, with $v_t$ the current transportation mode, $v_t'$ the previous transportation mode and $d_t$ the time from the last transition (ranging from 0 to infinity). In case there is no transition at time t+1, the new state will be equal to $x_{t+1}=[v_t,v_t',d_t+1]$. In case of a transition, the new state will be equal to $x_{t+1}=[v_{t+1},v_t,0]$, with $v_{t+1}$ the new transportation mode. Note that while the number of possible states increases (potentially to infinity), the number of possible transitions do not necessarily increase, so that the dynamic model is still easy to describe.

Since the number of possible states do increase a lot, it will no longer be possible to keep all the states and their associated probabilities in memory. Therefore, a strategy is necessary to only keep track of the most likely states and/or to fuse similar states at certain points. One can take advantage of the fact that the dynamic model is still independent of the previous transportation mode and the time from the last transition and that the observation model only depends on those state variables around the time of a transition. For example, instead of using 0 to infinity as possible values for $d_t$, you could use 0 to 10 and "more than ten" as possible values, effectively limiting the number of states drastically.

Figure 11:
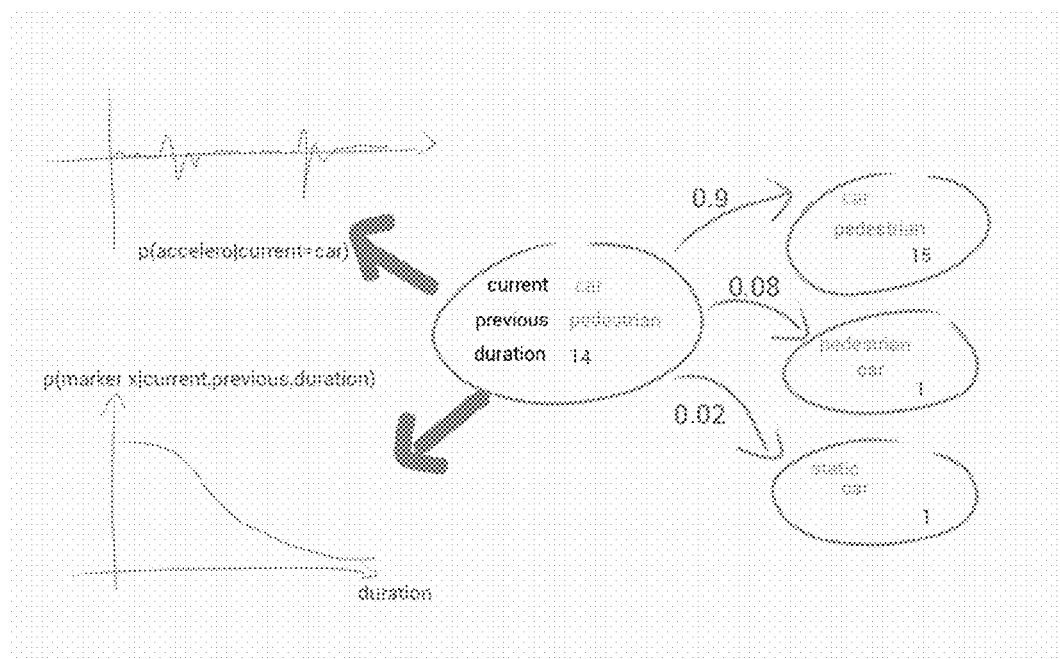
FIG. 11 illustrates a subset of a more advanced hidden markov model, as can be used in embodiments of the present invention.

FIG. 11 shows an example of a hidden markov model with the extended state, where only one node and the possible transitions for that node are displayed. By also adding whether or not a certain marker is already observed as a state variable, one can model marker events for which the probability of happening depends on whether or not they already happened. FIG. 11 more specifically illustrates a subset of a more advanced hidden markov model. The probability of observing a certain marker not only depends on the current transportation mode, but also on the time and type of the most recent transition (and possibly even the next transition). For example, suppose a user is asked to use an nfc tag every time he starts a car trip, this marker will most probably be observed around the time of the transition, but can also be observed later, for example when the user only remembers to tag after a while.

This model has great flexibility in modeling different kinds of markers and their specific characteristics. For example, suppose we have a marker at a bus stop. Whenever this marker is observed, this means that there is either a transition from bus to another transport mode or a transition from another transport mode to bus. This can be modeled by assigning high probabilities to observing this marker in states where there is a recent transition from or to bus and zero or near zero probability to other transitions. This will automatically make those states very unlikely.

Adding extra states (current/previous) and duration makes the model seemingly more complex as the transition matrix which needs to be modeled becomes several orders larger than the simple HMM in FIG. 10. However, the definition of real life use cases for activity recognition becomes more straight-forward when combined with markers. In daily life, there are a number of events that can occur that signal a single activity/state. E.g. paying at a register (cash register event) signals the end of shopping activity. These are events that are associated with a strict ordered sequence of activities. Many daily situations exist however where such a sequence does not exist or current technology does not allow to distinguish the sequence of activities on a local scale. E.g. a train station area could be signaled as taking the train in a simple HMM. However arriving at a station using for instance cell-localisation could be entering by train or could be entering by other modes (bus, metro, pedestrian). Cell localization with a typical accuracy of 100-300 m does not allow a finer analysis. It is therefore better to model this as an area of transition with a marker and the associated extended HMM model.

In a fifth example, the application of the method according to an embodiment of the present invention is described on a dataset with 3-axis accelerometer data captured from a smartphone, together with user supplied ground truth data captured through a mobile application. The user reports his current transport mode: foot, bike, car, tram, bus, train. This is kept as metadata together with position, time, speed and accelerometer data. The sample frequency is 10 Hz. The data is captured from three different test persons over a period of one week, observing the passage in a number of streets using different transport modes car, foot and tram.

Figure 12:
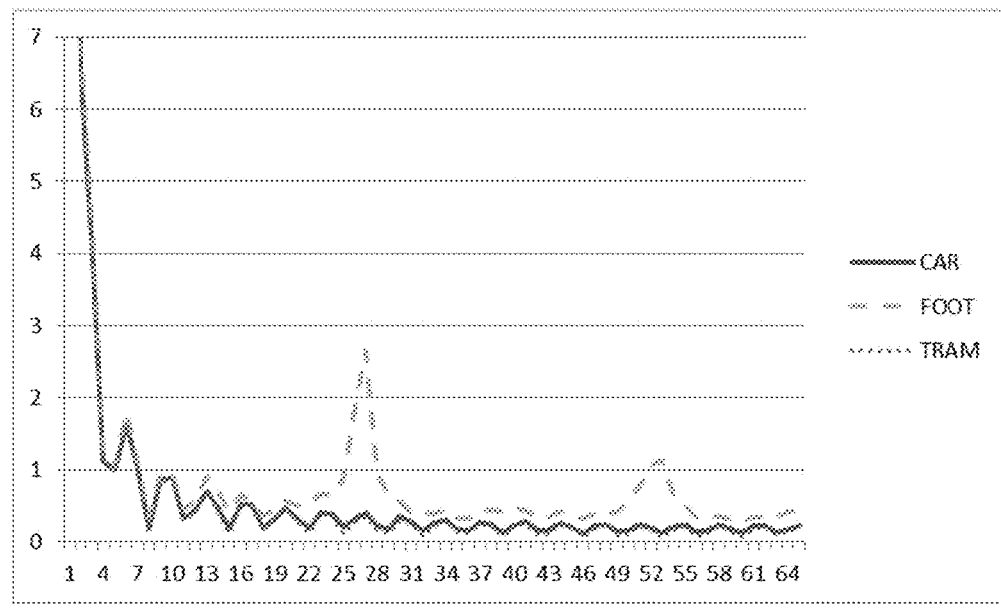
FIG. 12 illustrates the average amplitude accelerometer frequency spectrum for three observed transport modes as can be used in embodiments of the present invention.

The frequency spectrum of the amplitude accelerometer data is calculated for a given time window using FFT. In this example the time window is 10 sec with each window containing 100 observed samples. Windows are taken non-overlapping. The average and standard deviation of the spectrum for each transport mode is calculated. FIG. 12 shows an example of the average for a given data run.

For transport mode 'Foot', one can observe clear frequency modes corresponding to the walking rhythm of the test persons, which form distinguishable clusters in feature space to separate this transport mode from the others. The spectrum for the transport modes 'Car' and 'Tram' however lie very close together, which can be expected as both modes have been measured in the same urban context. This becomes apparent when performing automated mode detection using a bayes classifier:

|  | CAR | FOOT | TRAM |
| --- | --- | --- | --- |
| CAR | 54% | 15% | 30% |
| FOOT | 5% | 59% | 0% |
| TRAM | 0% | 0% | 0% |
| UNKNOWN | 41% | 26% | 70% |

Figure 13:
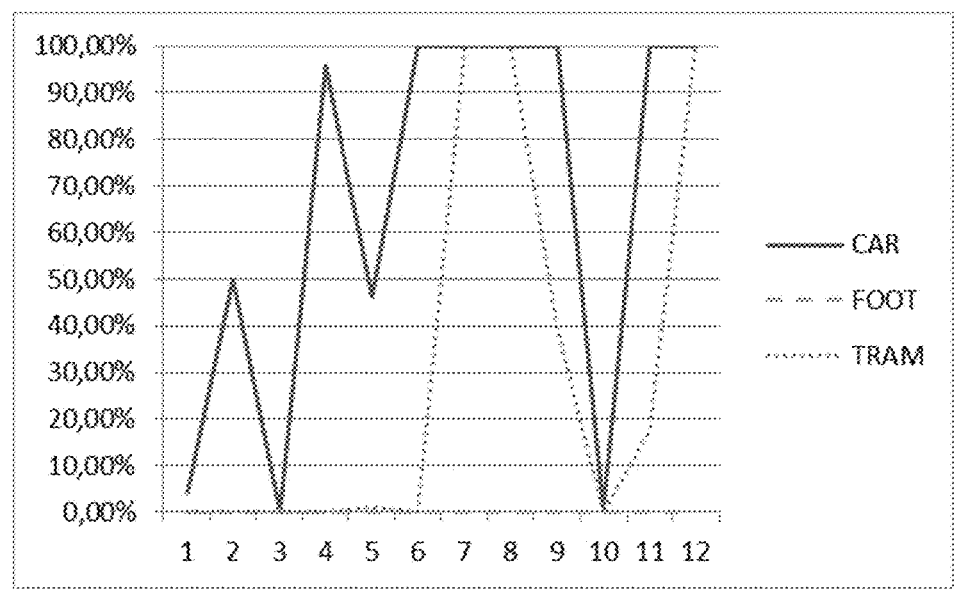
FIG. 13 illustrates a time snapshot of 12 samples showing a posteriori probability for each class every 10 seconds, as can be used in embodiments of the present invention.

The above table illustrates the confusion matrix of automated mode detection using a bayes classifier. The classifier shows average performance for 'Car' and 'Foot'. The mode 'Tram' however is completely missed, either classified as 'Car' or as 'Unknown'. The 'Unknown' class occurs when the a posteriori probabilities are equal and the MAP-classifier cannot make a unique decision. In this example, this occurs frequently in the case of Car and Tram. FIG. 13 illustrates this confusion.

This effect cannot be solved by local smoothing operations at the risk of losing performance. This is due to the similar spectra of Car and Tram.

In this example, a location marker is inserted at the transit stop which is often used when boarding the tram—in our example, the transit close to the workplace. The marker does not code probabilities of a state (in this case transport mode). Such a simple marker would not work correctly as the same location can be passed equally on foot, by car and by tram, depending on the occasion. A simple hidden markov model was implemented with the marker encoding the following state transition matrix:

|  | CAR | FOOT | TRAM |
| --- | --- | --- | --- |
| CAR | 1.00 | 0.00 | 0.00 |
| FOOT | 0.00 | 0.50 | 0.50 |
| TRAM | 0.00 | 0.50 | 0.50 |

The results of the effect of the HMM classifier can be seen in the below table illustrating the confusion matrix of automated mode detection using marker-based HMM. A slight improvement in the class 'Car' and a significant improvement in the class 'Tram' was seen.

|  | CAR | FOOT | TRAM |
| --- | --- | --- | --- |
| CAR | 60% | 15% | 0% |
| FOOT | 4% | 59% | 0% |
| TRAM | 0% | 0% | 90% |
| UNKNOWN | 36% | 26% | 10% |

The invention claimed is:

1. A client device for gathering mobility information of a user, the device comprising:
   an accelerometer sensor configured for collecting sensor data representative for transportation-characteristic information of a user, the transportation-characteristic information being information based on signals identifying transition from one form of transportation to another, as determined by the transportation of the user;
   a marker information obtaining means configured for collecting marker information, the marker information obtaining means comprising a detector for monitoring a use of the client device, wherein monitoring the use of the client device includes monitoring internet usage of the device by one or more of a WIFI interface, a Bluetooth interface, or a cell phone network, the marker information identifying an identified marker representative of an activity of a user by comparison to a marker information database;
   a processor programmed for combining the transportation-characteristic information of the user and the marker information so as to be able to determine based thereon mobility information of the user; and
   an output means adapted for outputting the combined transportation-characteristic information and the marker information;
   wherein the transportation-characteristic information and the marker information are recorded separately in a memory, based on time dependent storing, and the processor is programmed for combining the transportation-characteristic information and the marker information by time-aligning the transportation-characteristic information and the marker information.

2. A client device according to claim 1, wherein the processor is adapted for determining based on the marker information an identified marker representative of an activity of the user or an environmental parameter of the user.

3. A client device according to claim 1, wherein the processor is adapted for deriving a transition in mobility behavior based on the combination of the identified marker and the transportation-characteristic information.

4. A client device according to claim 3, wherein the processor is adapted for determining a transportation mode or a transition between two different modes of transportation using a transportation mode database.

5. A client device according to claim 1, wherein the processor is adapted for taking into account a probability that the identified marker occurs in combination with the determined transportation mode or the determined transportation mode transition.

6. A client device according to claim 1, wherein the system is a smart phone or wherein the system is implemented as a computer application.

7. A server device for gathering mobility information of a user, the device comprising:
   an input means for receiving a combination of sensor data representative for transportation-characteristic information of a user being information based on accelerometer signals identifying transition from one form of transportation to another, as determined by the transportation of the user, and marker information being related to internet usage of the device, the marker information being obtained by a detector monitoring the internet usage of the device by one or more of a WIFI interface, a Bluetooth interface, or a cell phone network; and
   a processor for determining based on said combination mobility information of the user;
   wherein the processor is adapted for determining an identified marker representative of an activity of the user or an environmental parameter of the user based on a comparison of the marker information with a marker database, and wherein the processor is programmed for combining the transportation-characteristic information and the marker information by time-aligning the transportation-characteristic information and the marker information, the transportation characteristic information and the marker information being recorded separately and being stored time dependently.

8. A server device according to claim 7, wherein the processor is adapted for determining mobility related information based on the marker information and the movement-characteristic information.

9. A server device according to claim 7, wherein the processor furthermore is adapted for determining based on the marker information an identified marker representative of an activity of the user or an environmental parameter of the user.

10. A server device according to claim 7, wherein the processor is furthermore adapted for deriving a transition in mobility behaviour.

11. A method for gathering mobility information of a user, the method comprising the steps of:
    collecting accelerometer sensor data representative for transportation-characteristic information of a user, the transportation-characteristic information being information based on signals identifying transition from one form of transportation to another, as determined by the transportation of the user;
    collecting marker information using a detector for monitoring a use of the client device, wherein monitoring the use of the client device includes monitoring internet usage of the device by one or more of a WIFI interface, a Bluetooth interface, or a cell phone network, the marker information identifying an activity of a user by comparison to a marker information database;
    the transportation-characteristic information and the marker information being recorded separately in a memory, based on time dependent storing;
    determining an identified marker representative of an activity of the user or an environmental parameter of the user based on a comparison of the marker information with a marker database;
    combining the transportation-characteristic information of the user and the marker information by time-aligning the transportation-characteristic information and the marker information so as to be able to determine based thereon mobility information of the user; and
    outputting the combined transportation-characteristic information and the marker information and the steps of receiving the combined transportation-characteristic information and the marker information; and determining based on said combination mobility information of the user.

12. A method according to claim 11, the method being implemented as a computer program product.

13. A method according to claim 11, the method being for obtaining a mobility information for a user and/or for obtaining a mobility map of an area.

14. A client device according to claim 1, wherein the transportation-characteristic information is information based on accelerometry data and GPS transportation data.

15. A client device according to claim 1, wherein the marker information obtaining means further comprises a set of tags for identifying marker information for gathering mobility information of at least one user.

16. A client device according to claim 15, wherein the set of tags comprises a plurality of stickers, bar codes or QR codes.

\* \* \* \* \*